United States Patent
Kusaba et al.

(10) Patent No.: US 6,510,556 B1
(45) Date of Patent: Jan. 21, 2003

(54) VIDEO DISTRIBUTING APPARATUS AND VIDEO DISTRIBUTING SYSTEM

(75) Inventors: Takuo Kusaba, Yokohama (JP); Yukio Shimamoto, Yokohama (JP); Takuo Tsuzuki, Chiba-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/321,128

(22) Filed: May 27, 1999

(30) Foreign Application Priority Data

May 28, 1998 (JP) .......................................... 10-147637

(51) Int. Cl.⁷ .............................................. H04N 7/173
(52) U.S. Cl. ............................. 725/93; 725/91; 725/95; 725/97
(58) Field of Search ............................. 725/93, 97, 87, 725/91, 37, 114, 116, 66, 95, 96, 86, 90; 370/436

(56) References Cited

U.S. PATENT DOCUMENTS

| | | | | |
|---|---|---|---|---|
| 4,995,078 A | * | 2/1991 | Monslow et al. | 725/97 |
| 5,465,385 A | * | 11/1995 | Ohga et al. | 725/58 |
| 5,561,456 A | | 10/1996 | Yu | |
| 5,631,694 A | | 5/1997 | Aggarwal et al. | |
| 5,642,418 A | * | 6/1997 | Farris et al. | 725/66 |
| 5,905,522 A | * | 5/1999 | Lawler | 725/131 |
| 6,072,982 A | * | 6/2000 | Haddad | 725/93 |
| 6,108,002 A | * | 8/2000 | Ishizaki | 725/87 |
| 6,211,901 B1 | * | 4/2001 | Imajima et al. | 725/93 |

FOREIGN PATENT DOCUMENTS

| | | |
|---|---|---|
| JP | 6-153198 | 5/1994 |
| JP | 9-205636 | 8/1997 |
| JP | 9-247643 | 9/1997 |
| JP | 9-247647 | 9/1997 |

* cited by examiner

*Primary Examiner*—John Miller
*Assistant Examiner*—Scott Beliveau
(74) *Attorney, Agent, or Firm*—Mattingly, Stanger & Malur, P.C.

(57) ABSTRACT

A video distributing apparatus for storing video data and distributing it to a viewer has a memory for video data and a schedule table for holding a distribution schedule of the stored video data. A controller controls the distribution of the stored video data. A reservation request includes a title of the video data to be distributed, a channel to be used for distribution of the video data of the title, and information to designate a time to start the distribution.

11 Claims, 10 Drawing Sheets

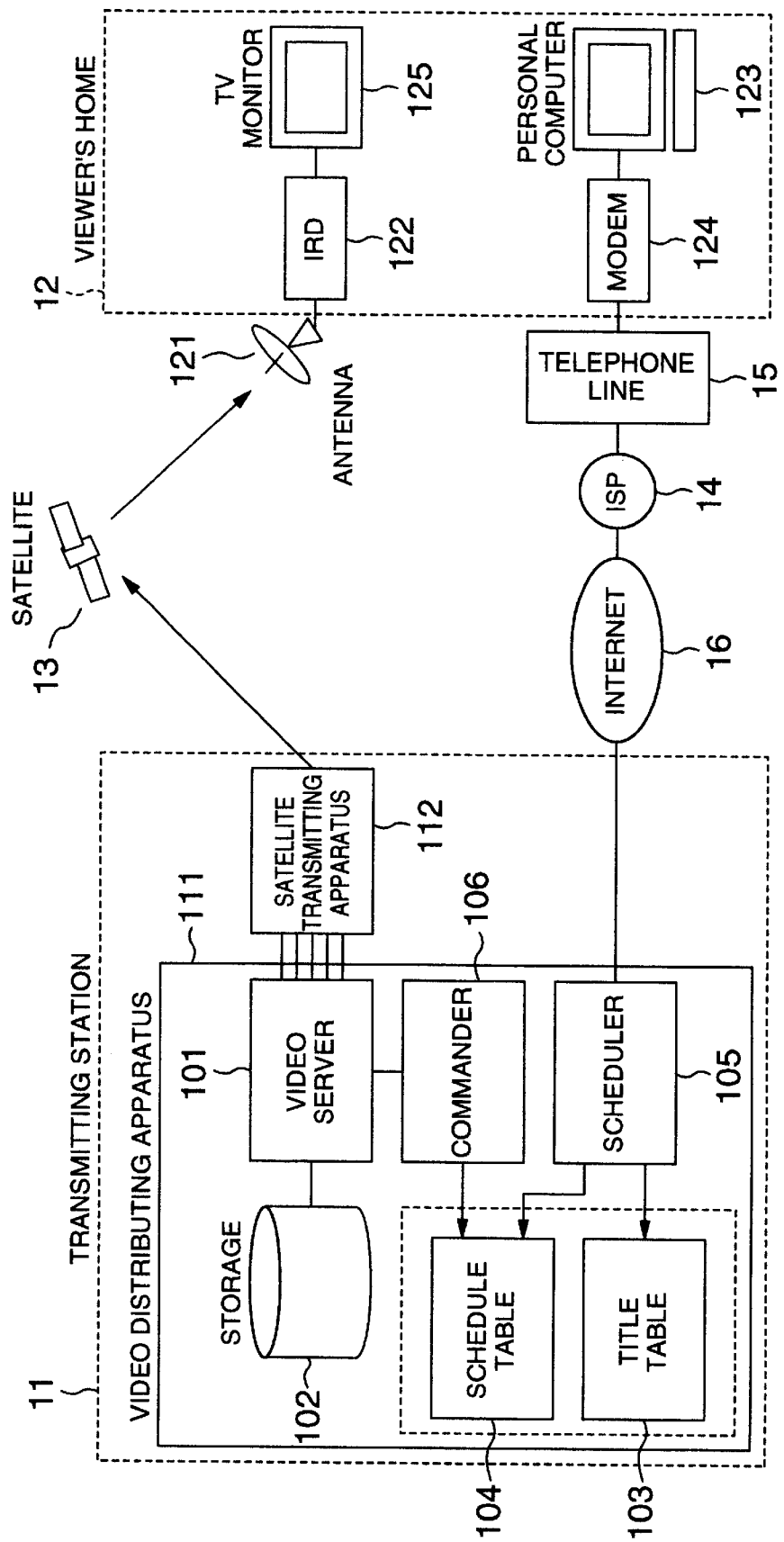

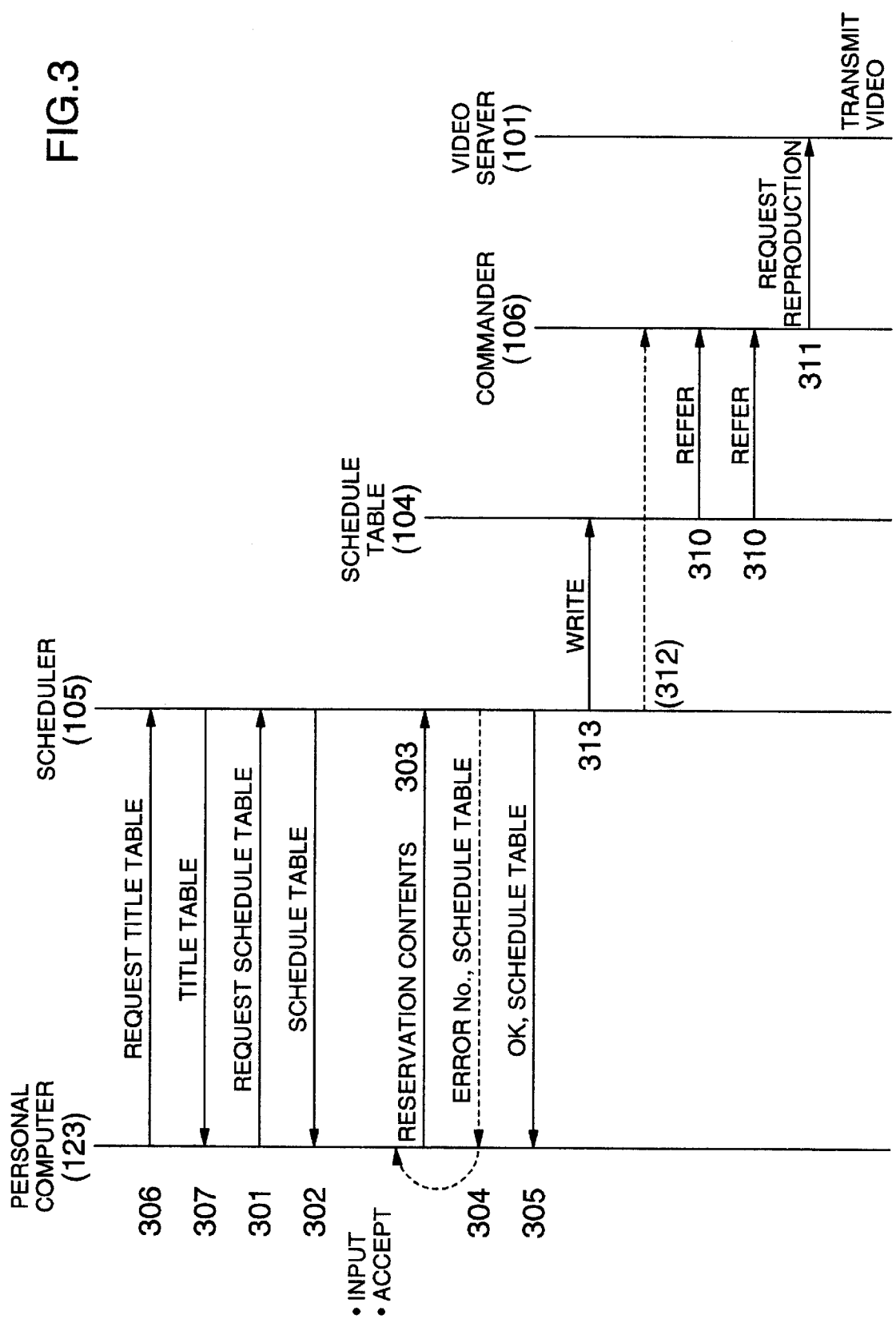

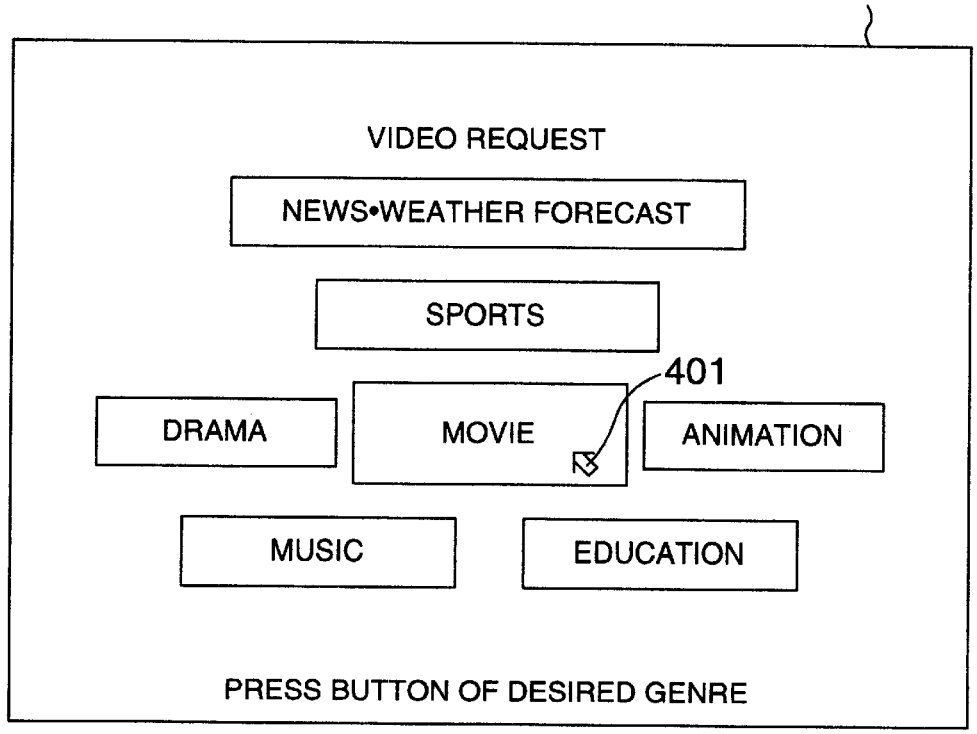

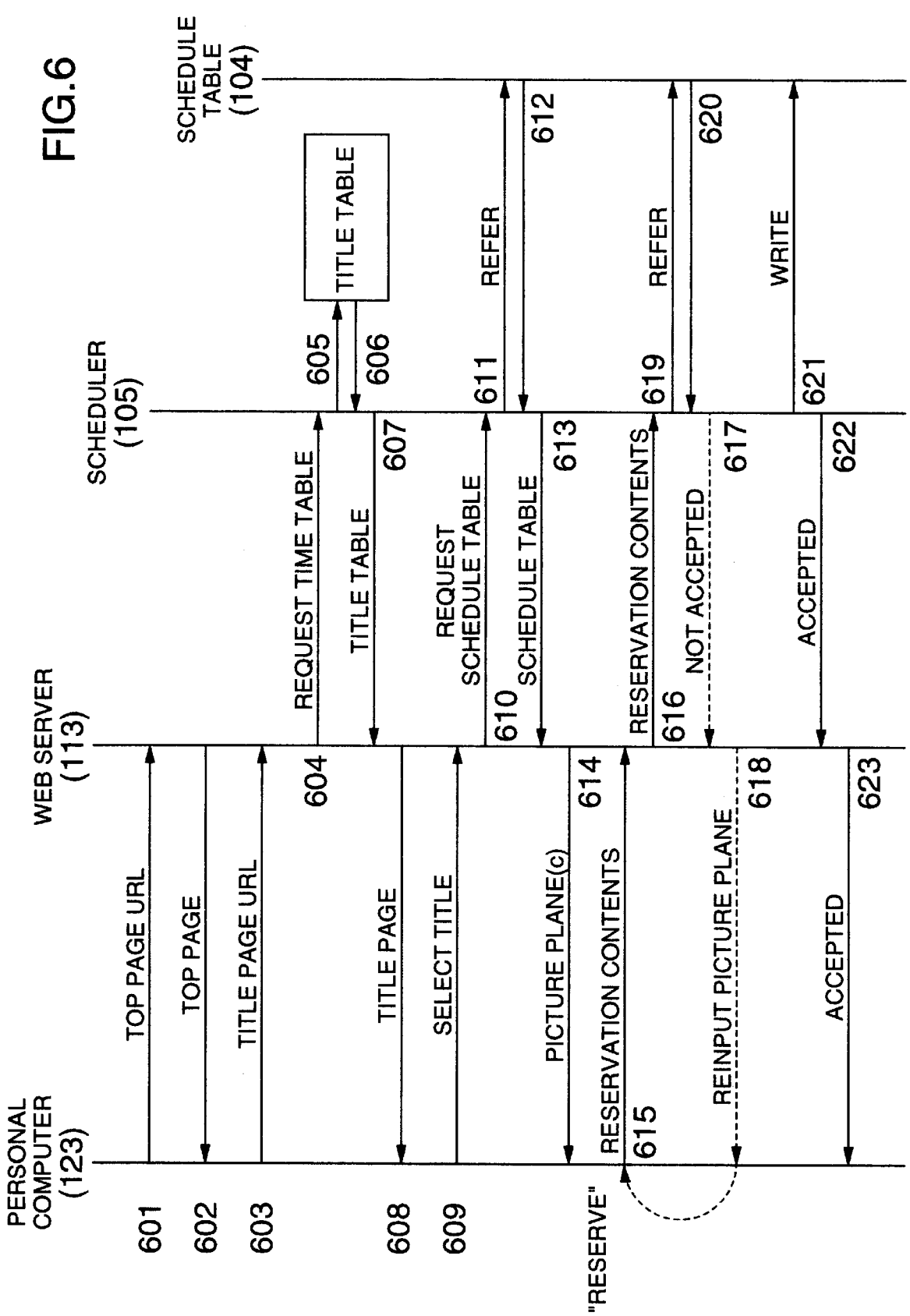

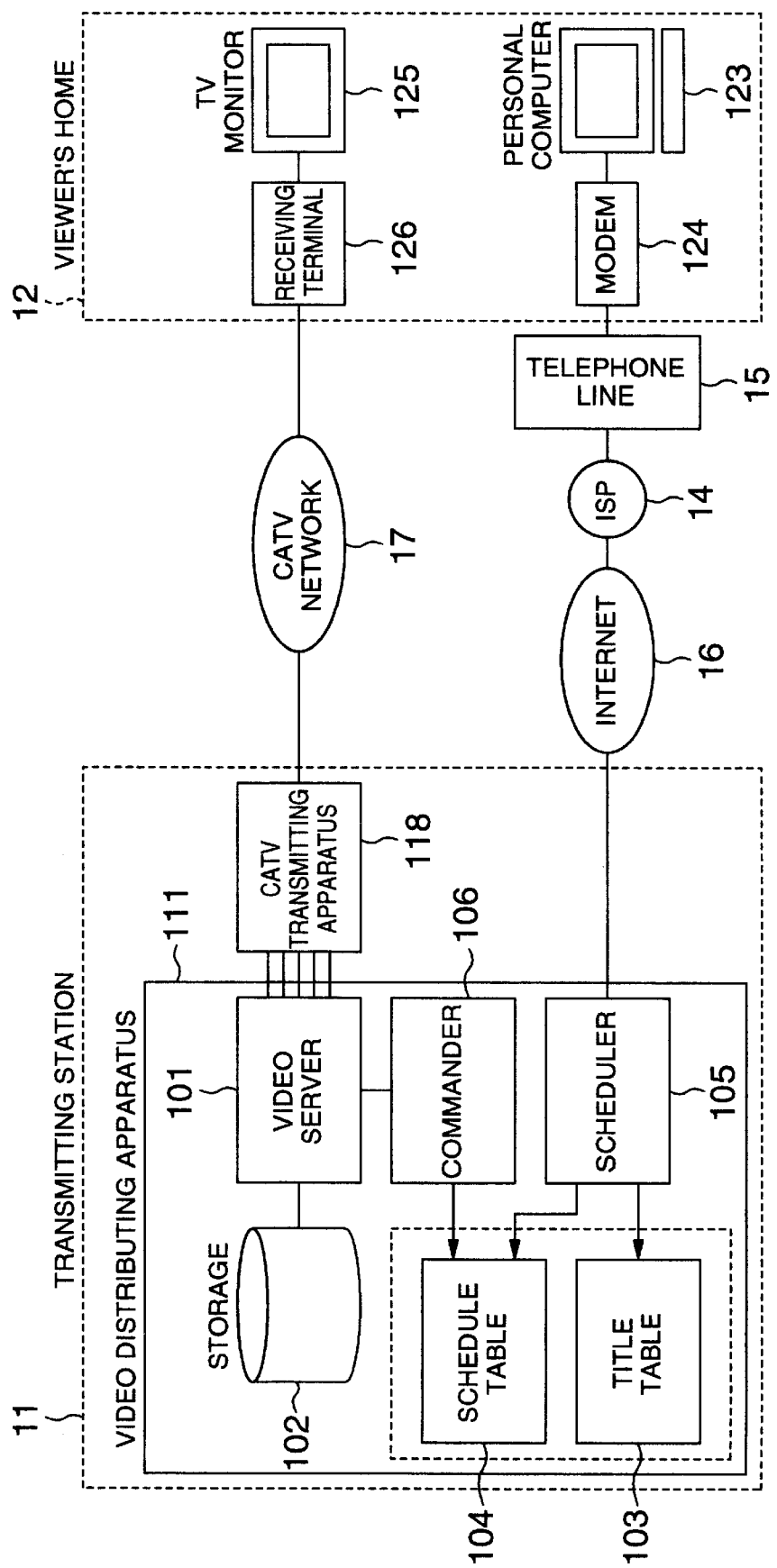

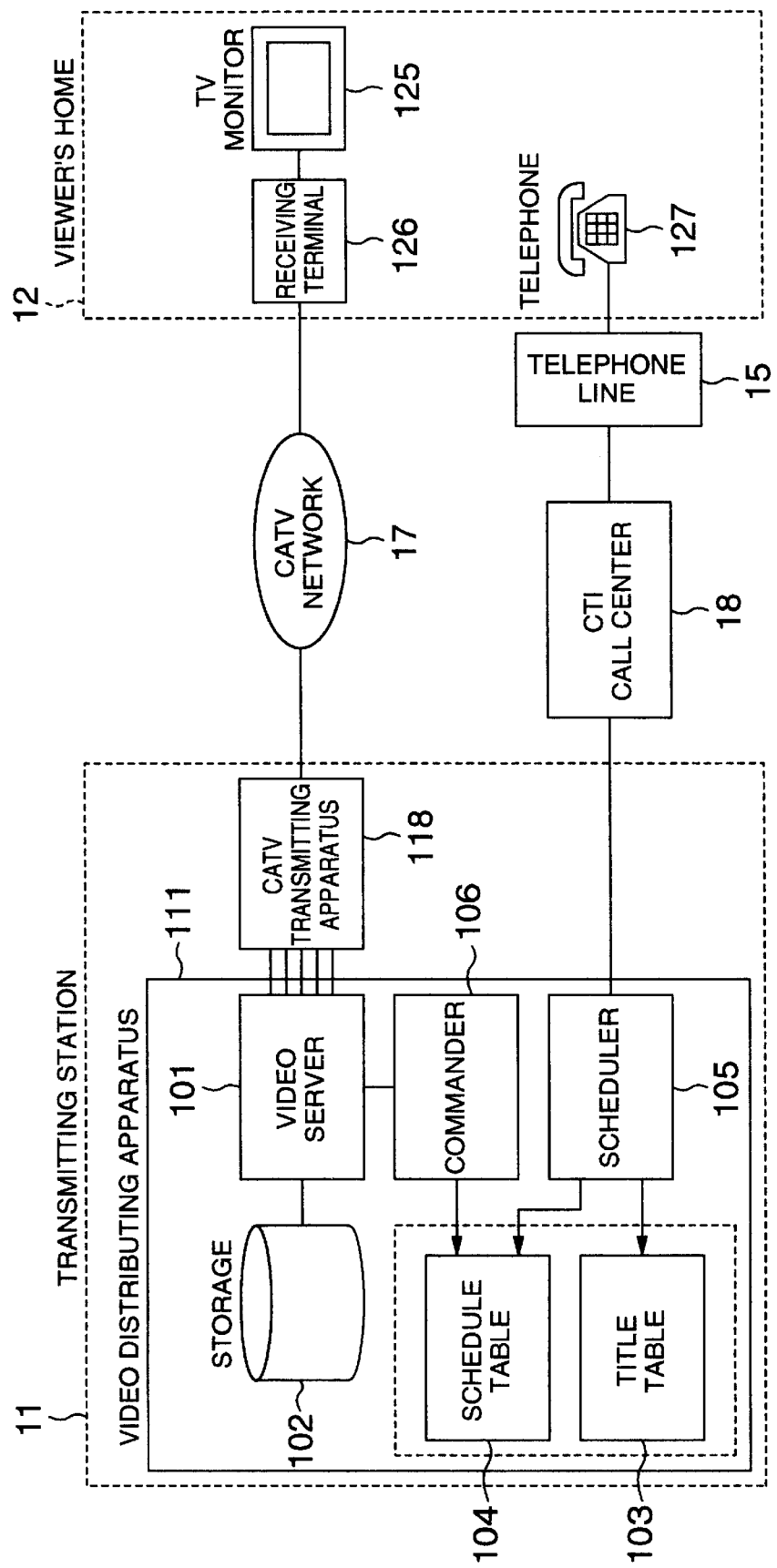

VIDEO DISTRIBUTING APPARATUS AND VIDEO DISTRIBUTING SYSTEM

BACKGROUND OF THE INVENTION

The invention relates to a video distributing apparatus for accepting a request of a viewer and automatically forming a distribution schedule of a video image. More particularly, in a transmission medium of multichannels of a satellite broadcasting, CATV, or the like, the invention relates to a video distributing apparatus suitable for use in a video distributing system in which a part of the transmission medium is opened as a request channel for video distribution and is used.

Hitherto, video images have been distributed by a ground wave television broadcasting. The number of channels of the ground wave television broadcasting in one district is up to about ten. A broadcasting station broadcasts a video image as a program and the viewer passively receives it. Home-use video tape or cassette recorders started to spread from about 20 years ago and the viewer can postpone a video view time by recording a television broadcasting. Sales or rental of video tapes also enable a desired video title to be selected. The cable television (CATV) which appeared in the Japanese market about 10 years ago increased the number of channels of the television to tens of channels. Owing to the satellite broadcasting which appeared in recent years, about 100 channels can be viewed at general homes. In future, digitalization of the ground wave television broadcasting is also planned and the realization of multichannels is progressing more and more.

On the other hand, in association with the progress in a transmitting technique and a compressing technique of digital data, study and development have been being progressed in recent years with respect to interactive video presenting services called a video-on-demand (VOD). Attention is paid to the VOD as means that is substituted for the rental video or CATV or as a video viewing method in a computer network. The VOD is a service which enables each viewer to immediately see his desired video title at desired time. The viewer can view a video image selected from a video database by operating it with a feeling using a video tape recorder. However, high costs are required for the VOD because a very high speed network is necessary. As a solution which can be realized in terms of the costs, a service called a near-VOD (NVOD) is considered. According to the NVOD, the same title is repetitively broadcasted by a plurality of channels and start time is shifted little by little (for example, every 15 minutes) for each channel, thereby enabling a video image to be viewed at a relatively free time.

As mentioned above, the VOD is not practical at present because of high costs. The NVOD as a solving measure is still uneconomical since one video title occupies a plurality of channels. The viewer is not free to select a desired title. A method of giving a right of the title option to the viewer has been disclosed in, for example, JP-A-9-247643, JP-A-9-205636, or the like. Even those prior arts, however, have a drawback such that the adaptability, smoothness, and response speed of services are inadequate because the transmitting station side possesses the other right of choice and right of decision.

SUMMARY OF THE INVENTION

It is an object of the invention to make it possible to realize a service such that a title which the viewer wants to see can be viewed at desired time and in a desired channel without needing high costs similar to those of the VOD.

To accomplish the above object, according to the invention, there is provided a video distributing system comprising: a video distributing apparatus constructed so as to accumulate and output video data; distributing means for distributing video data outputted from the video distributing apparatus to the viewer; a receiving apparatus for receiving the distributed video data and displaying a video image; and a terminal apparatus which is used to request for the video distributing apparatus to distribute the video image. The video distributing apparatus comprises: memory means in which video data has been accumulated; a schedule table to hold a distribution schedule of the video data accumulated in the memory means; scheduling means for accepting a reservation request from the viewer and updating the distribution schedule registered in the schedule table on the basis of the reservation request; and control means for controlling a distribution of the video data accumulated in the memory means on the basis of the distribution schedule held in the schedule table.

According to a preferred embodiment of the invention, the scheduling means comprises: checking means for discriminating whether the reservation request that is sent from the terminal apparatus can be accepted or not by considering to the distribution schedule of the video data registered in the schedule table; and means for, when it is determined as a result of the check in the checking means that the reservation request can be accepted, registering the reservation data based on the reservation request into the schedule table. The reservation request includes a title of the video data in which the distribution is reserved, a channel which is used to distribute the video data of such a title, and information to designate the start time of the distribution. The checking means discriminates whether the distribution of another video data which is distributed by using the same channel has been scheduled in a time zone that is determined on the basis of the distribution start time which is designated by the reservation request and that is overlapped to a distribution time zone of the video data to be distributed or not and determines whether the reservation request can be accepted or not in accordance with a result of such a discrimination.

BRIEF DESCRIPTION OF THE DRAWINGS

FIG. 2 is a block diagram of a video distributing system showing a system construction in case of applying the video distributing apparatus to a satellite broadcasting system;

FIG. 3 is a sequence diagram showing a communication sequence of the video distributing system;

FIG. 4A is an image diagram of a genre selection picture plane;

FIG. 4B is an image diagram of a title list picture plane;

FIG. 6 is a sequence diagram showing a communication sequence in the video distributing system shown in FIG. 5;

FIG. 7 is a block diagram showing a system construction of a video distributing system using a CATV network to which the invention is applied; and FIG. 8 is a block diagram showing another system construction of the video distributing system using the CATV network.

DETAILED DESCRIPTION OF THE EMBODIMENTS

Figure 1:
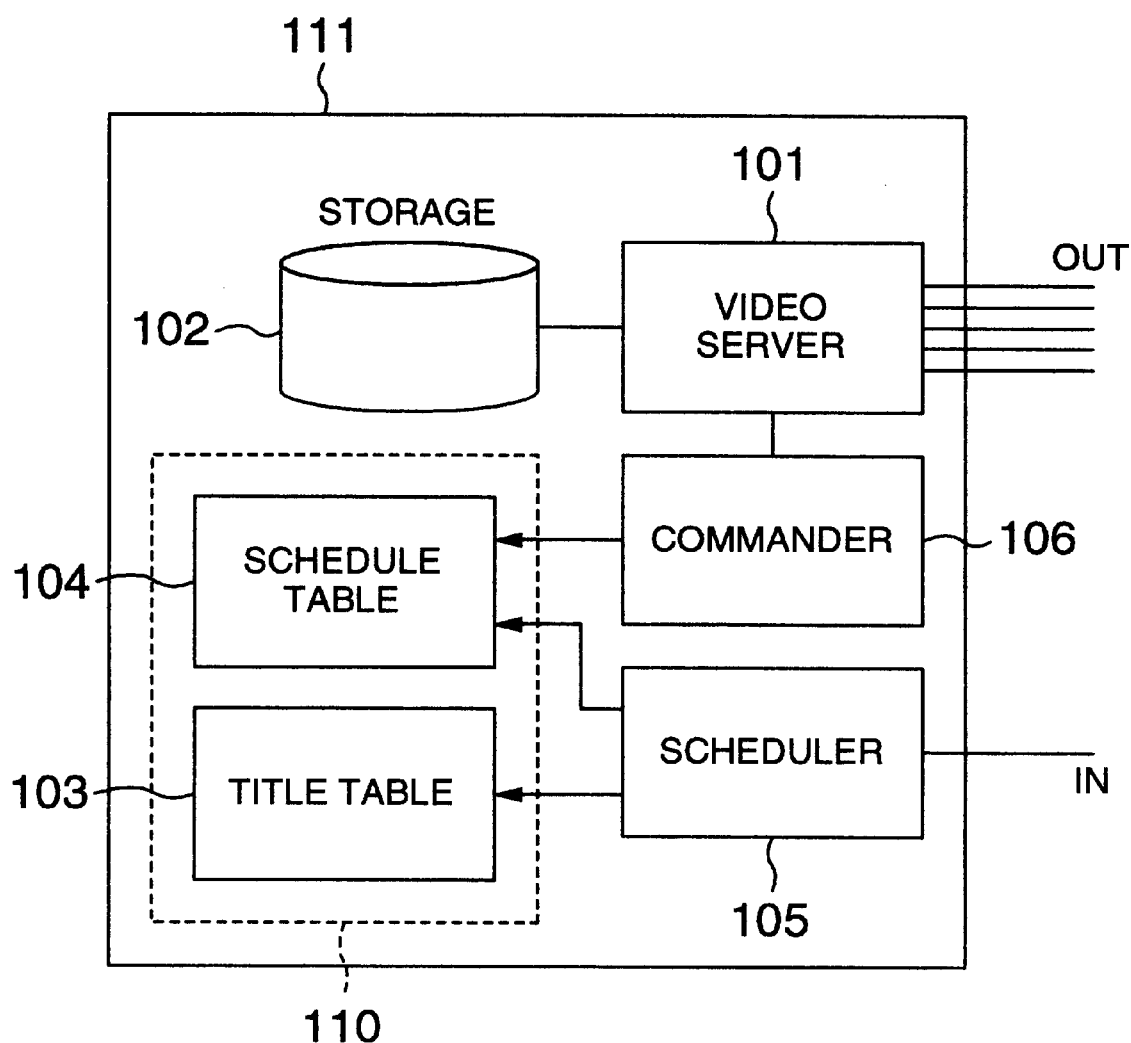
FIG. 1 is a block diagram of a video distributing apparatus to which the invention is applied.

FIG. 1 is a block diagram showing an embodiment of a video distributing apparatus to which the invention is applied.

As shown in FIG. 1, a video distributing apparatus 111 is constructed by including: a video server 101 to output a video image to an outside of the apparatus via an output line OUT; a storage 102 in which video images have been stored; a commander 106 to issue a command to the video server 101; and a scheduler 105 to accept a request from the outside and execute a scheduling. The video distributing apparatus 111 has: a title table 103 as a list of titles of the video images stored in the storage 102; and a schedule table 104 which is formed by the scheduler 105 on the basis of a request of the viewer. The title table 103 holding titles and other information of the video images stored in the storage 102 and the schedule table 104 to register a distribution schedule have been stored in a memory 110 of the video distributing apparatus 111. The scheduler 105 transmits the title table 103 and schedule table 104 to the viewer. The scheduler 105 receives the request transmitted from the viewer through a line IN and updates the schedule table 104.

FIG. 2 is a system constructional diagram showing a construction of a digital satellite broadcasting system as an example of a system to which the foregoing video distributing apparatus 111 is applied.

The digital broadcasting system shown in the diagram is constructed by including a transmitting station 11, a viewer's home 12, a satellite 13, an Internet Service Provider (ISP) 14, and a telephone line 15. The transmitting station 11 and ISP 14 are connected via the Internet 16.

The transmitting station 11 is constructed by having: the video distributing apparatus 111 shown in FIG. 1; and a satellite transmitting apparatus 112 for transmitting a video signal which is outputted by the video distributing apparatus 111 toward the satellite 13 by using a radio wave as a conveying medium. The video signal transmitted by the satellite transmitting apparatus 112 is relayed by the satellite 13 and is distributed to the viewer's home 12. Although only one viewer's home 12 is shown here, it will be obviously understood that a number of viewer's homes can exist.

The video receiving system at the viewer's home 12 includes: a receiving antenna 121 to capture the signal from the satellite 13; an IRD (Integrated Receiver Decoder) 122 to decode a digital signal; and a television monitor 125 to display a video image. The video signal received by the receiving antenna 121 is sent to the television monitor 125 via the IRD 122 and is displayed on a display screen of the television monitor. To request the video title, distribution time of the video image, a distribution channel of the video image, and the like, the viewer's home 12 includes a personal computer 123 and a modem 124 to connect the personal computer 123 to the telephone line 15. The viewer operates the personal computer 123 and connects the personal computer 123 to the transmitting station 11 by a protocol such as TCP/IP or the like through the Internet 16. A dedicated program (hereinafter, called client software) to communicate with the transmitting station 11 via the Internet has been installed in the personal computer 123.

FIG. 3 is a sequence diagram showing a communication procedure between the viewer's home 12 and transmitting station 11. FIGS. 4A to 4F show picture planes which are displayed by the client software which is displayed on a display of the personal computer 123. A write sequence of the request from the subscriber's home 12 to the transmitting station 11 will now be described hereinbelow with reference to FIGS. 3 and 4A to 4F.

Figure 4C:
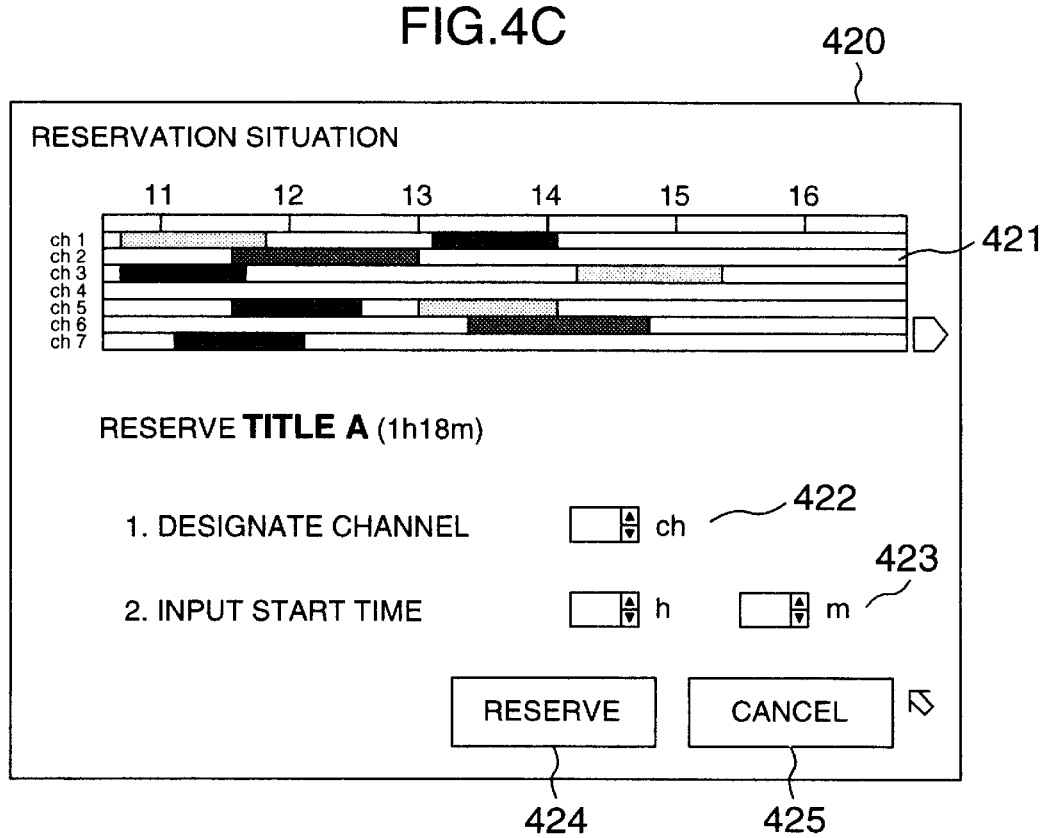
FIG. 4C is an image diagram of a reservation input picture plane.
Figure 4D:
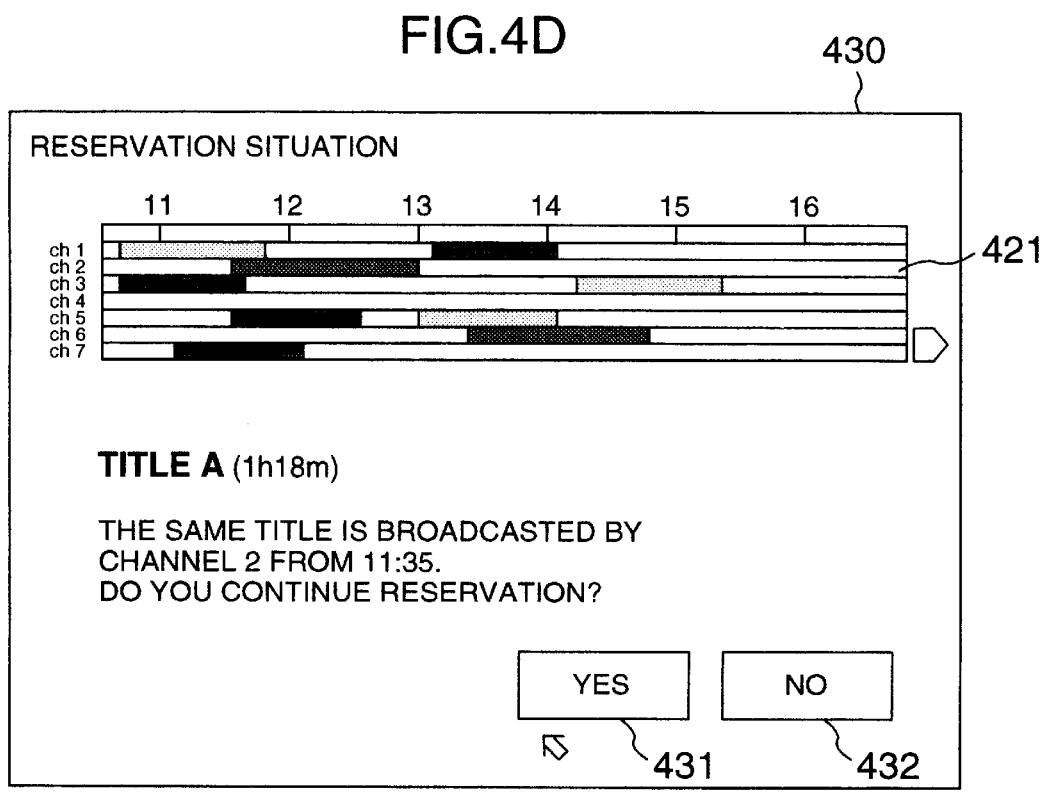
FIG. 4D is an image diagram of a reservation situation picture plane.

An initial picture screen or plane 400 shown in FIG. 4A is first displayed on the display of the personal computer 123. When, for example, "movie" is selected by a mouse pointer 401, the client software transmits a title table request to the scheduler 105 of the video distributing apparatus 111 and requests that the contents of the title table 103 (step 306) be transmitted. When the title table request is received, the scheduler 105 reads out the title table 103 from the memory 110 and returns it to the personal computer 123 as a message having the contents of the title table 103 (step 307). On the basis of the transmitted contents of the title table 103, the client software on the personal computer 123 displays a title list picture plane 410 shown in FIG. 4B onto the display. When there are too many titles and they cannot be fully displayed in the screen, a scroll bar 412 is displayed. By operating it by a mouse, the viewer can scroll the screen. When the viewer selects a desired title from the title list and presses a "reserve" button 411, a reservation input picture plane 420 shown in FIG. 4C is displayed. In this instance, the personal computer 123 transmits a schedule table request and requests the scheduler 105 to send the contents of the schedule table 104 (step 301). When the schedule table request is received, the scheduler 105 reads out the schedule table 104 from the memory 110 and returns a response message including those contents to the personal computer 123 (step 302). On the basis of the contents of the transmitted schedule table, the client software on the personal computer 123 displays a time table 421 showing a reservation situation onto the reservation input picture plane 420. Although not shown in FIG. 4C, a title is also displayed in each line of the time table 421. Thus, the viewer can know the present reservation situation. If the video image of the same title has already been reserved here, the client software displays such a fact as a message by a reservation situation picture plane 430 shown in FIG. 4D. When the reservation situation picture plane 430 is displayed, the viewer can select any one of the following operations. For example, since the video image is transmitted by radio wave, so long as the viewer sets the channel at the time which has already been reserved, he/she can monitor the video image of the desired title in a form such that he/she takes advantage of the reservation. In this case, by clicking a "NO" button 432 by the viewer, the display on the screen is returned to the title list picture plane 410. Thus, instead of reserving the video image of the title which has already been designated, the viewer can continue the reservation with respect to a video image of another title. As another operation, the viewer can also newly reserve so as to start from a different time. In this case, by clicking a "YES" button 431 by the viewer, the reservation input picture plane 420 in FIG. 4C is displayed.

In case of newly reserving the distribution of a video image, on the reservation input picture plane 420, the viewer inputs a channel whose distribution is desired into the channel input column 422 and inputs a time at which the start of the distribution is desired into a start time input column 423. After they were inputted to the input columns, the viewer clicks a "reserve" button 424. Since the number of channels is limited, if the video image of the same title as the title desired by the viewer has already been reserved by another viewer at a time near the time desired by the viewer, it is desirable to allow the viewer to see the video image distributed on the basis of such a reservation. In such a case, therefore, it is considered to use a service format such that, for example, the transmitting station 11 does not accept the reservation of the same title within five minutes, or when the viewer will newly make a reservation at such a near time, a slightly high additional fee is charged, or the like. In response to the click of the "reserve" button 424, the client software discriminates whether the start time set by the viewer lies within a time zone when the reservation can be accepted or not. For example, the distribution time zone of the video image whose distribution was desired is obtained from the inputted channel and the start time and whether the distribution of the video image in the same channel has already been scheduled in this time zone or not is discriminated. If the reservation of another distribution has already been scheduled in the distribution time zone of the desired video image, the client program does not accept the inputted reservation but displays a message to promote the viewer to reinput and again displays the reservation input picture plane 420. The viewer clicks a "cancel" button 425 when he/she wants to return from the reservation input picture plane 420 to the title list picture plane 410.

When the viewer clicks the "reserve" button 424 and the request can be accepted, the client software transmits the inputted reservation contents to the scheduler 105. The title of the video image to be distributed, the designation of the channel which is used for distribution, and the start time of the distribution are included in the reservation contents. After that, the client software waits for a response from the scheduler 105 (step 303). With reference to the contents of the schedule table 104, the scheduler 105 discriminates whether the received reservation contents can be accepted or not in a manner similar to the client software. For example, there is considered a situation such that another viewer makes another reservation into an overlapped time zone on the same channel for a period of time until the processes in steps 302 and 303 corresponding to a request accepting procedure are executed. In such a case, the reservation into the time zone is not accepted and the scheduler 105 transmits an error number and the schedule table at this time point to the personal computer 123 (step 304). In the personal computer 123, when the client software receives it, a message indicating that another reservation has already been made is displayed on the screen. The client software updates the contents of the time table 421 and displays a reinput request picture plane 450 shown in FIG. 4F, thereby promoting the viewer to reinput.

Figure 4E:
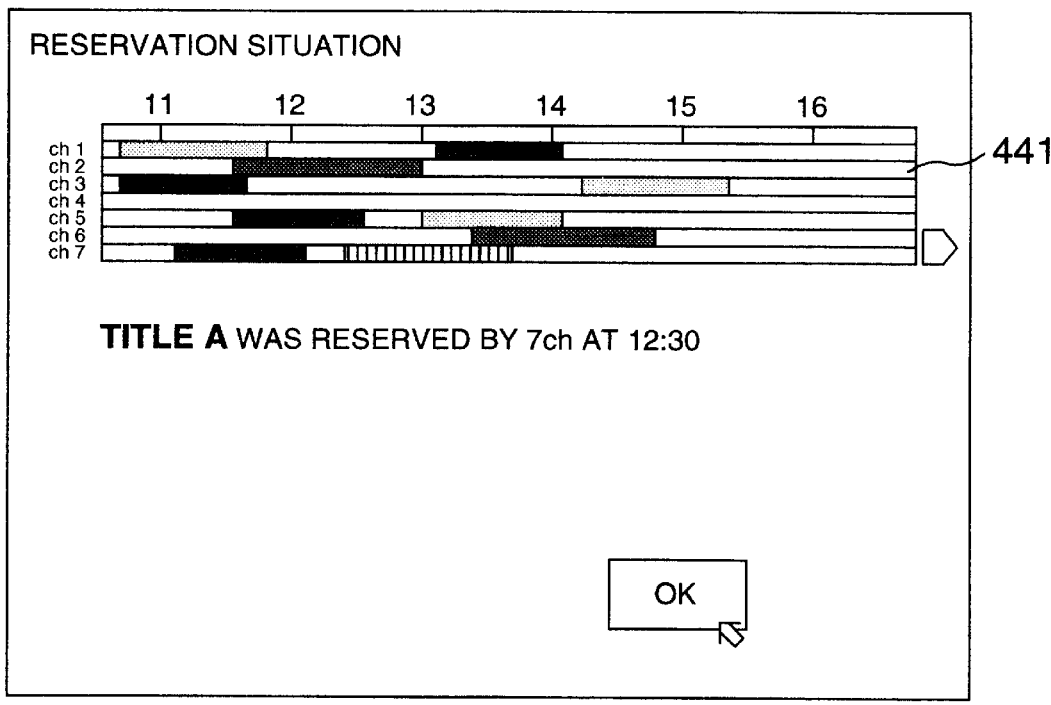
FIG. 4E is an image diagram of a reservation completion notice picture plane.
Figure 4F:
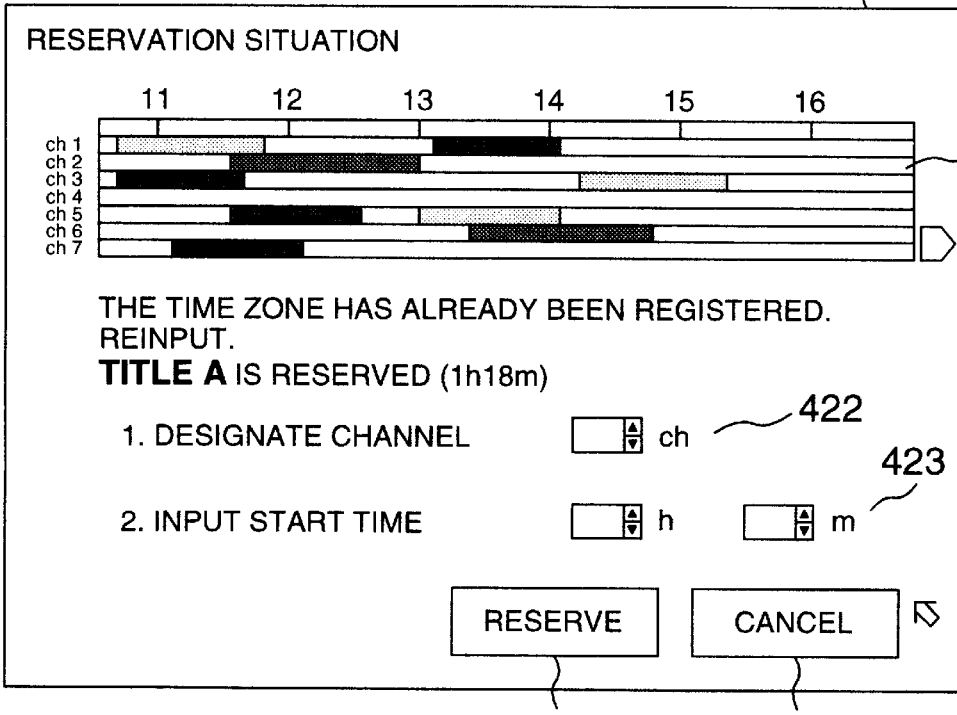
FIG. 4F is an image diagram of a reinput request picture plane.

When it is determined that the received reservation contents can be accepted in step 303, the scheduler 105 notifies the personal computer of such a fact. At this time, the scheduler transmits together with the contents of the schedule table to which the received reservation contents were reflected (step 305). By receiving them, the personal computer 123 displays a message indicative of the completion of the reservation onto the screen and displays a time table 441 updated on the basis of the new schedule table as shown in FIG. 4E. The scheduler 105 writes the reservation contents into the schedule table 104 (step 313).

The commander 106 periodically (for example, every minute) refers to the schedule table 104 (step 310). As mentioned above, the reservation contents are written into the schedule table 104 and when there is a video image to be reproduced, the commander 106 transmits a reproduction request of such a title and a channel of a reproduction destination to the video server 101 (step 311). The video server 101 reads out the video image of the designated title from the storage 102 and sends it to the designated channel.

The video server 101 and satellite transmitting apparatus 112 are connected by a plurality of lines OUT corresponding to the channels. The satellite transmitting apparatus 112 transmits the video image sent from the video server 101 toward the satellite 13 by a radio wave. This method is similar to that of a general satellite broadcasting and, in the viewer's home 12, when the reserved time comes, the viewer selects the channel of the television monitor 125 and receives the desired broadcasting.

In the embodiment, the commander 106 periodically distributes with reference to the schedule table 104. In place of such a construction, it is also possible to construct as follows. In step 313, when the scheduler 105 writes the reservation contents into the schedule table 104, the scheduler 105 notifies the commander 106 of a fact that the schedule table 104 was updated (step 312). When this notice is received, with reference to the schedule table 104, the commander 106 records the contents of the schedule table into a memory device which the commander 106 has. After that, the commander 106 controls the distribution of the video image in accordance with the contents of the schedule table recorded in the own memory device. As for the contents of the schedule table 104, upon recording of the schedule table into the memory device of the commander 106, it is not always necessary to write the contents of the whole table each time. It is sufficient to update differential contents between the new schedule table and the schedule table already recorded in the memory device.

Figure 5:
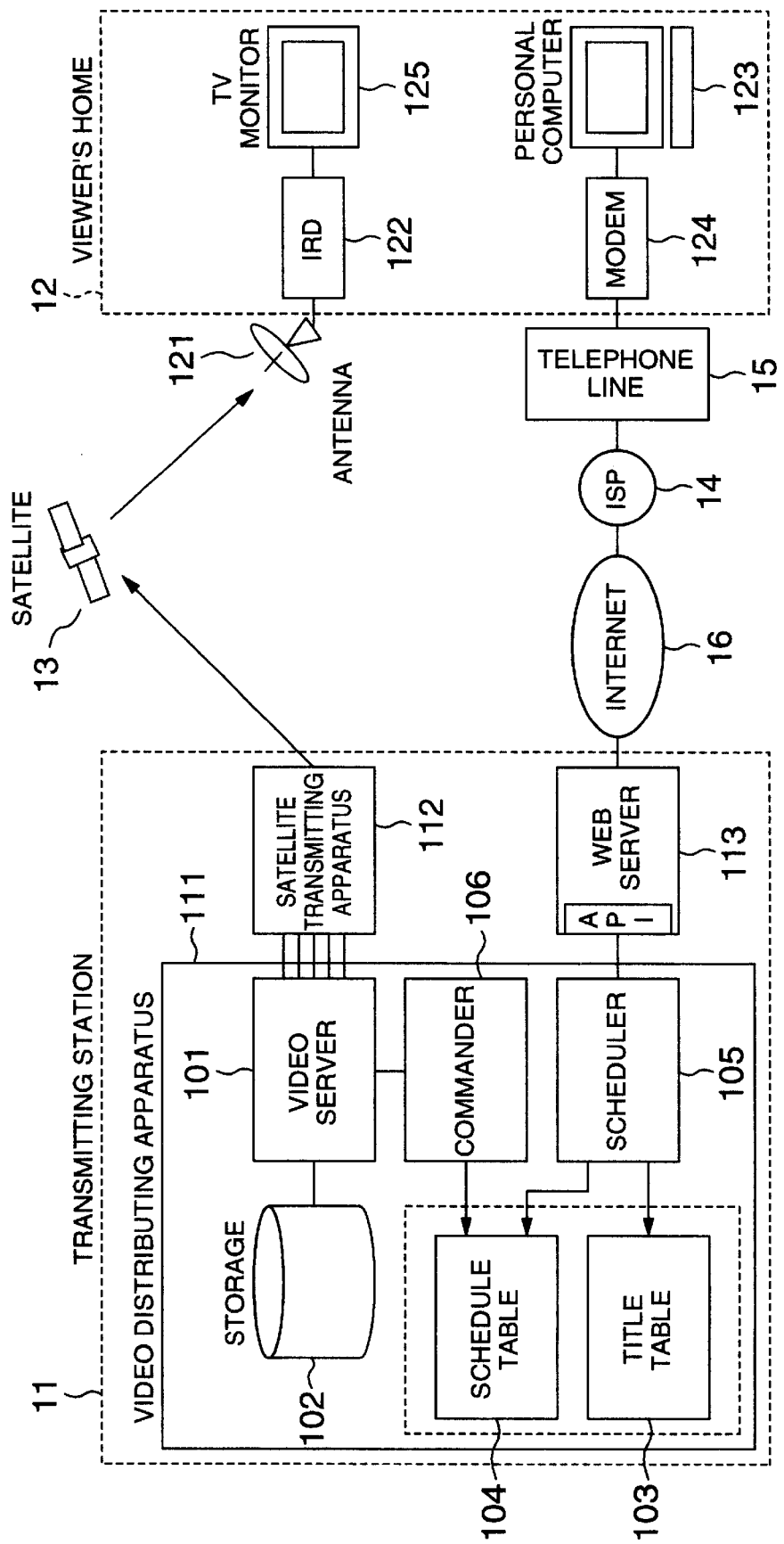
FIG. 5 is a block diagram showing a system construction of a video distributing system in the second embodiment.

FIG. 5 is a system constructional diagram showing a construction in the second embodiment of a digital satellite broadcasting system to which the invention is applied.

The digital satellite broadcasting system in the embodiment is constructed fundamentally in a manner similar to the digital satellite broadcasting system in the first embodiment described before. In the embodiment, in place of the client software as a dedicated program, a Web browser has been installed in the personal computer 123. A Web server 113 is arranged between the video distributing apparatus 111 and Internet 16 in accordance with it. The Web server 113 not only transmits a Web page but also has an application interface (API) to communicate with another process.

FIG. 6 is a sequence diagram showing a communication procedure in the digital satellite broadcasting system shown in FIG. 5.

The personal computer 123 first issues a URL of a top page to the Web server 113 and requests page data to display the initial picture plane 400 (step 601). In response to this request, the Web server 113 transmits the page data to display the top page similar to the initial picture plane 400 shown in FIG. 4A to the personal computer 123 (step 602). On the basis of the transmitted page data, the personal computer 123 displays the top page. The viewer selects a video genre to be monitored by clicking it.

It is now assumed that the viewer selects "movie" as a video genre. The Web browser of the personal computer 123 issues a URL of the title page regarding "movie" and requests to transfer the title page (step 603). When the URL of the title page is received, the Web server 113 issues a request to the scheduler 105 to send the title table (step 604). In response to this request, the scheduler 105 reads out the title table 103 (steps 605 and 606) and transfers the contents of the title table 103 to the Web server 113 (step 607). On the basis of the contents of the received title table 103, the Web server 113 dynamically makes a title page to display a list of titles and to accept the selection of the title in a manner similar to the title list picture plane 410 shown in FIG. 4B and sends it to the personal computer 123 (step 608). The viewer selects a desired title from the displayed title list and clicks the "reserve" button 411. When the selection by the viewer is received, the personal computer 123 transmits a message of the title selection toward the Web server 113 (step 609).

When the message of the title selection is received, the Web server 113 issues a request to the scheduler 105 to send the contents of the schedule table 104 (step 610). In response to this request, the scheduler 105 accesses the schedule table 104 (step 611), reads out the contents (step 612), and returns the read-out contents of the schedule table 104 to the Web server 113 (step 613). On the basis of the received contents of the schedule table, the Web server 113 displays in a manner similar to the reservation input picture plane 420 shown in FIG. 4C, forms a reservation input page to accept the reservation input, and transmits it to the personal computer 123 (step 614).

The personal computer 123 receives the reservation input page and displays the reservation input picture plane 420. The viewer performs a reserving operation similar to the operation for the reservation input picture plane 420 in the above embodiment and clicks the "reserve" button 424. The reservation contents set by the reservation input page are transmitted from the personal computer 123 to the Web server 113 (step 615). The title of the video image to be distributed, the channel which is used for distribution, and the start time of the distribution are included in the reservation contents which are transmitted here. The Web server 113 transfers the reservation contents received from the personal computer 123 to the scheduler 105 as they are (step 616).

With reference to the schedule table 104 (steps 619 and 620), the scheduler 105 discriminates whether the reservation contents can be accepted or not. In a manner similar to the foregoing embodiment, for example, if another reservation has already been made in the overlapped time zone of the same channel, the reservation is not accepted. In such a case, the scheduler 105 notifies the Web server 113 of a message indicating that the reservation is not accepted (step 617). When the message showing that the reservation is not accepted is received, the Web server 113 displays the reinput request picture plane 450 to promote the reinput and transmits the reinput page to receive the reinput to the personal computer 123 (step 618). The picture plane which is displayed as a reinput page is a picture plane such that an error message "The time zone has already been reserved. Reinput." is added to the reservation input picture plane 420.

When the reservation can be made, the scheduler 105 writes reservation contents into the schedule table 104 and updates the contents of the reservation table 104 (step 621). In this instance, a message indicative of the reception of the reservation is sent to the Web server 113 (step 622). When this message is received, the Web server 113 dynamically forms the picture plane (FIG. 4E) to notify of a fact that the reservation was made as a Web page and sends it to the personal computer 123 (step 623).

Since the subsequent processes in the embodiment, namely, processes regarding the distribution of the video image by the commander 106 and video server 101 are executed in a manner similar to those in the embodiment described above, their description is omitted here.

FIG. 7 is a block diagram showing a construction of a CATV system as an example of further another video service system to which the invention is applied.

The CATV system in the embodiment is obtained by replacing the facilities regarding the satellite broadcasting between the video server 101 and television monitor 125 by the facilities regarding the CATV network in the satellite broadcasting system shown in FIG. 2. That is, a CATV network 17 is used in place of the satellite 13 and the satellite transmitting apparatus 112 is replaced by a CATV transmitting apparatus 118. As equipment which is used on the viewer's home 12 side, a receiving terminal 126 is provided in place of the antenna 121 and IRD 122. The CATV transmitting apparatus 118 transmits the video signal outputted from the video server 101 to the CATV network 17. The receiving terminal has a function to convert the video signal sent through the CATV network 17 into a signal which can be monitored by the television monitor 125. The other apparatuses and the like are similar to those in the first embodiment. Since a procedure for the reserving process of the video distribution, the distribution of the video image, the receiving process, and the like is similar to that of the first embodiment, its detailed description is omitted here.

FIG. 8 is a block diagram showing an example of a system construction in case of requesting a video image through a public telephone line in the CATV system shown in FIG. 7. In this embodiment, the video distribution is requested from the viewer's home 12 by a telephone 127 in place of the personal computer. In this case, as a facility which is used to request between the viewer's home 12 and transmitting or broadcasting station 11, a call center 18 using a CTI (Computer Telephony Integration) is provided in place of the ISP 14 and Internet 16 in FIG. 7.

In the embodiment, a list of titles of the video images which can be distributed is preliminarily distributed to the viewer's home 12. A peculiar code number is allocated to the title list every video title and a desired title can be specified by the code number. When requesting, the viewer calls to the call center 18. When the telephone is connected to the call center 18, a voice guidance to guide the operation to request is sent from the call center 18. The viewer inputs a reservation time and a code number added to each program by pressing push buttons of the telephone 127 in accordance with the voice guidance. The reservation time and code number inputted by the operation of the push button are translated to data of a format which can be processed by the computer in the call center 18 and are transmitted to the scheduler 105 by a protocol such as TCP/IP or the like. In a manner similar to the embodiment described so far, the scheduler 105 discriminates whether the reservation can be accepted or not with reference to the contents of the schedule table 104. If the reservation can be accepted, the schedule table 104 is updated and the scheduler 105 notifies the call center 18 of a message indicative of the completion of the reservation. When the message showing the reservation completion is received, the call center 18 forms a voice message showing such a fact and supplies it to the telephone 127 via the telephone line 15. When the reservation cannot be accepted, the scheduler 105 notifies the call center 18 of such a fact. The call center 18 forms a message such as "The time zone has already been reserved. Reinput." in a manner similar to the case of the reservation completion and sends it to the telephone 127 of the viewer's home 12.

According to the invention as described above, the video, distributing apparatus to distribute the video image in accordance with the request of the viewer is provided. The system costs can be suppressed as compared with those of the VOD. When the number of requests from the viewers is not so large, services similar to those of the VOD can be performed and the invention can be easily applied to the existing satellite broadcasting or CATV.

The present invention is not limited to the foregoing embodiments but many variations and modifications are possible within the scope of the spirit of the present invention. For example, in the above embodiments, although different media have been used for a communication path which is used when requesting and a distribution path of the video image, a line that is common to both of the request and the video distribution can be also used. For example, by connecting the viewer's home and the broadcasting station by using an xDSL (Digital Subscriber Line) of a high speed modem, such a construction can be realized. In this case, the video image can be also received by the personal computer 123 without using the television monitor. The use of the personal computer can be also omitted by adding a requesting function to the television monitor 125.

What is claimed is:

1. A video distributing system comprising:
   a video server which has a memory in which video data has been stored and outputs the video data stored in said memory;
   a distributor which distributes the video data outputted by said video server;
   a receiver which receives the video data distributed by said distributor and displays a video image based on said video data;
   a terminal apparatus which inputs a reservation of a distribution of the video data from a viewer and issuing a reservation request including a title of the video data to be distributed, a channel to be used for the distribution of the video data of said title, and information to designate a time to start the distribution;
   a scheduler which performs a scheduling of the distribution of the video data stored in said memory on the basis of the reservation request which is sent from said terminal apparatus, and holds a result of said scheduling as a schedule table; and
   a controller which instructs said video server to output the video data on the basis of the distribution schedule registered in the schedule table held in said scheduler.

2. A system according to claim 1, wherein said distributor comprises:
   a transmitter which transmitts the video data outputted from said video server via a radio wave; and
   a satellite which relays the video data transmitted by said transmitter, and distributes toward said receiver.

3. A system according to claim 1, wherein said distributor comprises:
   a CATV network; and
   a CATV transmitting apparatus which distributes the video data outputted from said video server via said CATV network.

4. A system according to claim 1, wherein said scheduler comprises:
   a checker which discriminates whether the reservation request from said terminal apparatus can be accepted or not by considering to the distribution schedule of the video data registered in said schedule table; and
   a register which registers reservation data based on said reservation request into said schedule table when it is determined that said reservation request can be accepted as a result of the discrimination by said checker.

5. A system according to claim 4, wherein said checker discriminates whether a distribution of another video data which is distributed by using said channel has been scheduled in said schedule table in a time zone that is overlapped to a distribution time zone of said video data to be distributed which is decided on the basis of a distribution start time which is designated by said reservation request or not and determines whether said reservation request can be accepted or not in accordance with a result of said discrimination.

6. A video distributing apparatus comprising:
   a memory in which video data has been stored;
   a schedule table for holding a distribution schedule of the video data stored in said memory;
   a scheduler which accepts a reservation request including a title of the video data whose distribution is reserved, a channel which is used for distribution of video data of said title, and information to designate a time to start the distribution from a viewer and updating the distribution schedule registered in said schedule table on the basis of said reservation request; and
   a controller which controls the distribution of the video data stored in said memory on the basis of the distribution schedule held in said schedule table.

7. An apparatus according to claim 6, wherein said scheduler comprises:
   a checker which discriminates whether the reservation request can be accepted or not by considering the distribution schedule of the video data registered in said schedule table; and
   a register which registers reservation data based on said reservation request into said schedule table in the case where it is determined that said reservation request can be accepted as a result of the discrimination in said checker.

8. An apparatus according to claim 7, wherein said checker discriminates whether distribution of another video data that is distributed by using said channel has been scheduled in said schedule table in a time zone that is overlapped to a distribution time zone of said video data to be distributed that is determined on the basis of a distribution start time which is designated by said reservation request or not and decides whether said reservation request can be accepted or not in accordance with a result of said discrimination.

9. A distributing method of a video image in a video distributing apparatus to distribute video data via a plurality of channels, comprising the steps of:
   previously storing the video data as a distribution target into a memory;
   accepting a reservation request including a title of the video data whose distribution is reserved, a channel which is used for distribution of the video data of said title, and information to designate a time to start the distribution from a viewer;
   scheduling the distribution of the video data on the basis of said reservation request and registering a result of said schedule into a schedule table; and
   distributing the video data stored in said memory on the basis of the schedule registered in said schedule table.

10. A method according to claim 9, wherein said registering step comprises the steps of:
    discriminating whether said reservation request can be accepted or not by considering to the distribution schedule of the video data which has previously been registered in said schedule table; and
    registering reservation data based on said reservation request into said schedule table when it is determined that said reservation request can be accepted as a result of said discrimination.

11. A method according to claim 10, wherein said discriminating step comprises the steps of:

discriminating whether the distribution of another video data which is distributed by using said channel has been scheduled in a time zone that is overlapped to a distribution time zone of said video data to be distributed which is determined on the basis of a distribution start time that is designated by said reservation request or not; and determining whether said reservation request can be accepted or not in accordance with a result of said discrimination.

* * * * *